Oct. 19, 1965 C. A. BODGE 3,213,239
THERMAL TIME DELAY RELAY FOR SWITCHING AND PROTECTING
START AND PHASE WINDINGS OF MOTORS
Filed July 29, 1959 3 Sheets-Sheet 1
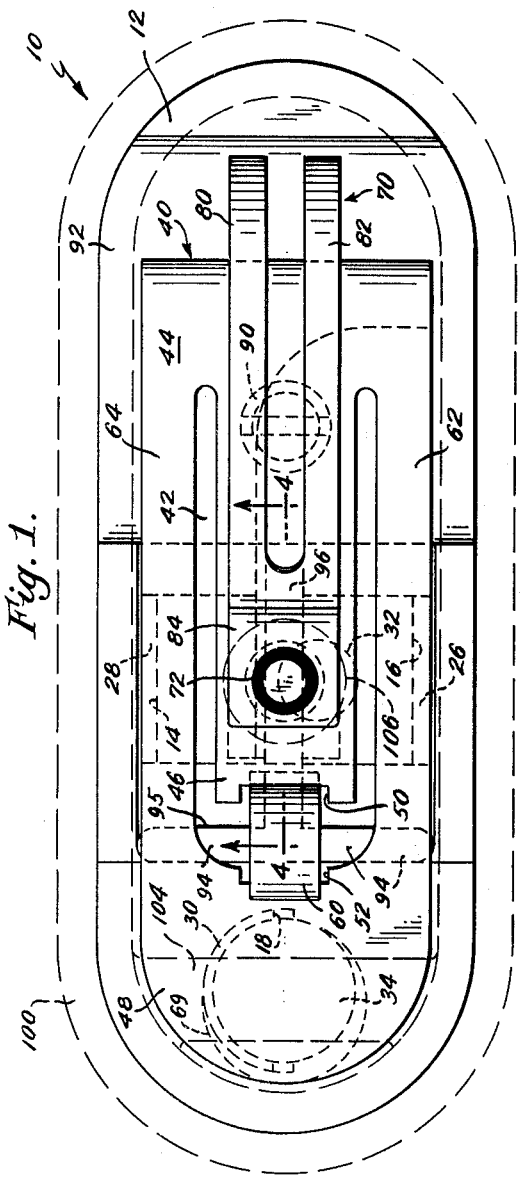
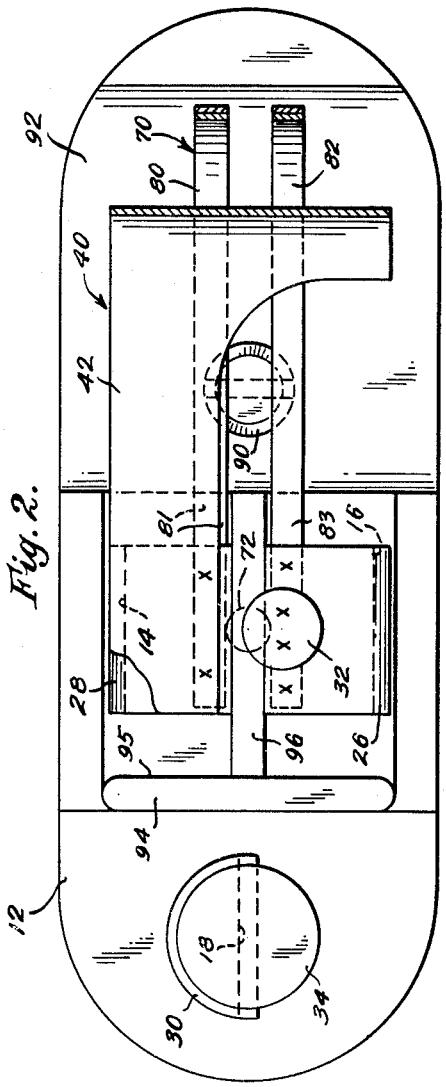
*Inventor,*
*Clifford A. Bodge,*
by Harold Levine
*Att'y.*

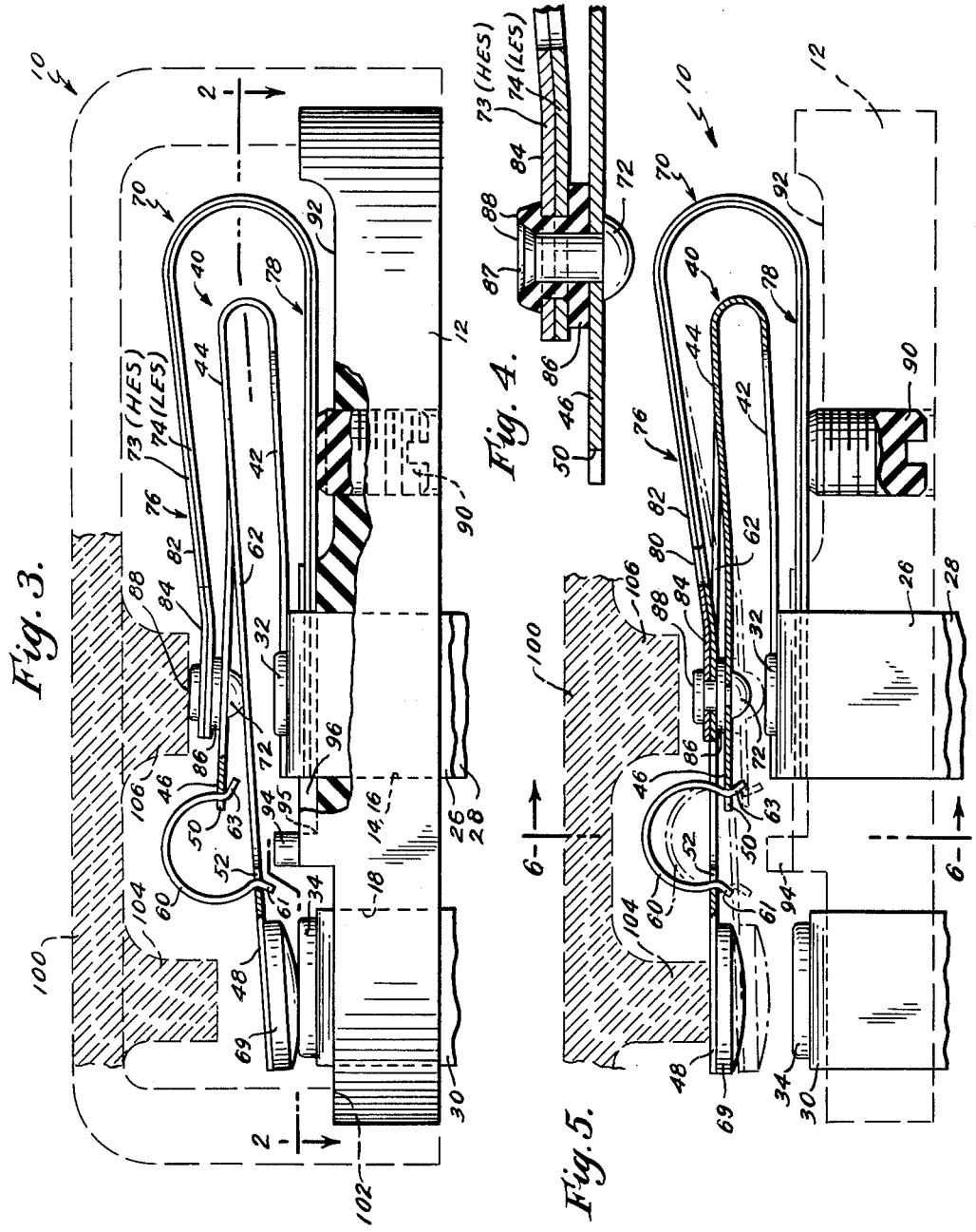

Oct. 19, 1965 C. A. BODGE 3,213,239
THERMAL TIME DELAY RELAY FOR SWITCHING AND PROTECTING
START AND PHASE WINDINGS OF MOTORS
Filed July 29, 1959 3 Sheets-Sheet 3
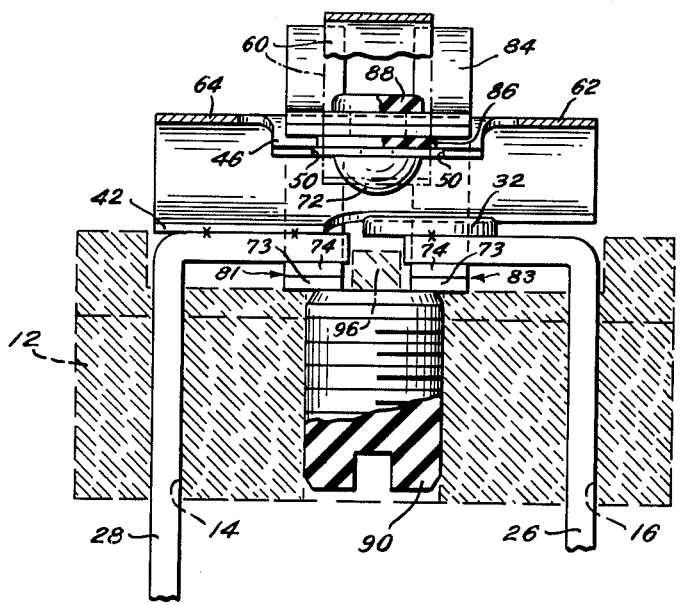
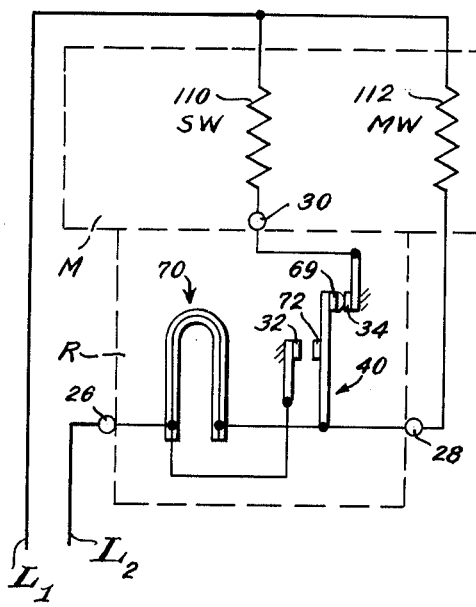
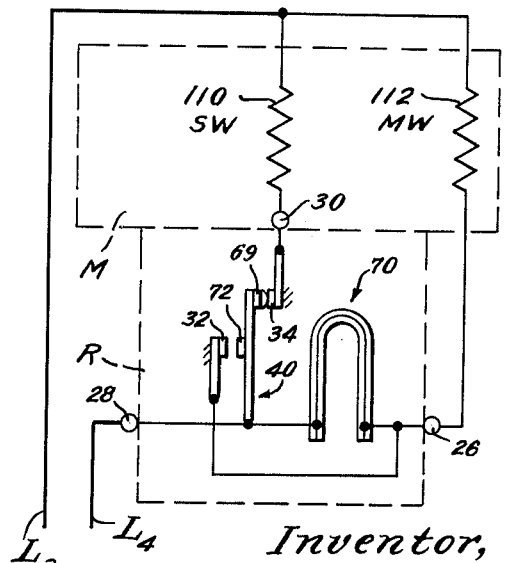
Inventor,
Clifford A. Bodge,
by Harold Levine
Att'y.

3,213,239
Patented Oct. 19, 1965

3,213,239
THERMAL TIME DELAY RELAY FOR SWITCHING AND PROTECTING START AND PHASE WINDINGS OF MOTORS

Clifford A. Bodge, Attleboro, Mass., assignor to Texas Instruments Incorporated, Dallas, Tex., a corporation of Delaware
Filed July 29, 1959, Ser. No. 830,319
11 Claims. (Cl. 200—113)

The instant invention relates to thermal protective devices, and more particularly, to thermal time delay relays. The time delay relays of the instant invention are especially suited for, though not limited to, protecting the start or phase windings of split-phase electric motors, particularly horsepower split-phase electric appliance type motors having high density start windings. The start or phase winding is generally of a fine relatively high resistance wire and generally can withstand continuous operation for only a short time. It is, therefore, important that a protective device for a split-phase electric motor should not permit the start winding to be subjected to currents for a damaging length of time or to those which are excessively high. The start winding relay must be effective to de-energize a start winding in the short time specified for the particular motor and make it impossible for the start winding to become re-energized at an improper time.

It is one object of the invention to provide a thermal time delay relay which will accomplish the above objectives.

It is another object to provide a thermal time delay relay which is adapted for miniaturization, is simple and inexpensive to manufacture and yet dependable in the performance of its functions.

It is another object of the invention to provide a relay which is especially applicable for protecting and switching the phase or start winding of fractional horsepower split-phase electrical motors such as, for example, are employed in refrigeration installations, electrical appliances, e.g. washing machines, electric dryers, etc., and business machines, e.g. electric typewriters and calculators, etc.

It is another object to provide a thermal time delay relay which employs an electrically conducting thermostatic element which is self-protecting and is operative to shunt itself out to prevent over-heating thereof.

It is another object to provide a thermal time delay relay for the purposes described, the operation of which is relatively independent of the ambient temperature.

It is another object of the instant invention to provide a thermal time delay relay for the purposes described which affords a quick reset.

Among the further objects of the instant invention are the provisions of a thermal time delay relay which is durable, accurate, reliable in operation, compact, and which is versatile and susceptible to varying electrical ratings in diverse applications; which embodies a minimum number of parts and which is simple and economical to assemble and manufacture.

Other objects will be in part apparent and in part pointed out hereinafter.

The invention accordingly comprises the elements and combinations of elements, features of construction, and arrangements of parts which will be exemplified in the structures hereinafter described and the scope of the application of which will be indicated in the following claims.

In the accompanying drawings, in which one of the various possible embodiments of the invention is illustrated:

FIG. 1 is a top plan view, with the cover outlined in broken lines, of a thermal relay according to the instant invention;

FIG. 2 is a sectional view taken substantially on line line 2—2 of FIG. 3;

FIG. 3 is a side elevation of the thermal relay shown in FIG. 1 with portions of the cover shown in broken lines;

FIG. 4 is an enlarged, side elevation of a detail of the relay shown in FIG. 1;

FIG. 5 is a fragmentary elevational view similar to FIG. 3 indicating relative movement between parts;

FIG. 6 is a sectional view taken on line 6—6 of FIG. 5; and

FIGS. 7 and 8 are wiring diagrams for the relay illustrated in FIGS. 1–6 in combination with a split-phase electric motor.

Dimensions of certain of the parts as shown in the drawing have been modified for the purposes of clarity of illustration.

Similar reference characters indicate corresponding parts throughout the several views of the drawings.

Referring now to the drawings, there is illustrated, in FIGS. 1–6, the thermal time delay relay of the instant invention, generally referred to by numeral 10. Thermal relay 10 includes a base member 12 formed of one of the conventional, electrically insulating plastics, such as a moldable, phenolic resinous material. Base member 12 is a provided with a plurality of vertically open-ended slots 14, 16 and 18 opening exteriorily of the base 12, which respectively and co-operatively interfit with and mount electrically conductive terminals 28, 26 and 30. Terminal 26 is provided with a stationary electrical contact 32 fixedly mounted and electrically connected to its upper surface. Terminal 30 similarly mounts a fixed electrical contact 34, which is electrically connected thereto, as shown.

Thermal relay 10 includes an electrically conducting switch means generally indicated at 40, which may be formed of a conventional electrically conducting material such as a beryllium copper or Phosphor bronze alloy. Switch means 40 generally comprises a U-shaped member (as best seen in elevation in FIGS. 3 and 5) and includes a lower leg 42 and an upper leg 44. Lower leg 42 is electrically connected at one end to and mounted on terminal 28, as by welding, as best seen in FIGS. 2 and 6. Upper leg 44 provides two contact-carrying arms 46 and 48, as best seen in FIGS. 1 and 3.

Arm 48 has mounted at its free end thereof on its lower surface an electrical contact 69 for engagement with contact 34. Arm 46 has mounted and electrically connected to one end thereof, at its lower surface, an electrical rivet contact 72 for engagement with stationary contact 32.

Contact arms 46 and 48 are integral with each other, at one end as best seen in FIG. 1. The free end of contact-carrying arm 46 is provided with a notch 50 which is adapted to receive one end of a thin C-shaped overcenter toggle spring 60. Contact-carrying arm 48 is provided with a notch 52 which opens toward and is in alignment with notch 50 and is adapted to receive the other end of overcenter spring 60, as best seen in FIGS. 1 and 3. Arms 46 and 48 are movable relative to each other and are maintained in one of two positions of stability by spring 60, each of which positions of stability are shown in the full line portions of FIGS. 3 and 5. Overcenter spring 60 is effective to bias arms 46 and 48 into a position of stability and maintain them in a non-coplanar relation, as best seen in FIGS. 3 and 5. Upon the application of a sufficient force against arm 46, either upwardly or downwardly, as seen in FIG. 3, overcenter spring 60 is effective, in response to the application of a force, to cause arm 48 to move relative to arm 46 from one position of stability to another with a snap action.

Overcenter spring 60 has bent portions 61 and 63, as best seen in FIG. 3, which interfit respectively with notches 52 and 50 to prevent vertical and lateral relative movement between spring 60 and contact-carrying arms 46 and 48. Overcenter spring 60 is strong enough to provide adequate contact pressure between contacts 69 and 34 and to afford snap-acting movement of arm 48 from one position of stability to another and yet weak enough to permit the application of a force to arm 46 from a bimetal element, to be described below, so as to effect snap-acting relative movement between the arms.

Contact-carrying arm 48 includes two relatively narrow leg portions 62 and 64, as best seen in FIG. 1. As will be described in greater detail below, when thermal relay 10 is employed as a protective and switching device for the start winding of a split-phase motor, switch means 40 carries start winding current to the outer legs 62 and 64 of contact-carrying arm 48 and carries main winding current to its central portion, contact-carrying arm 46. The cross section of the outer leg portions 62 and 64 is a minimum as regulated by a current-carrying capacity. The central portion, contact arm 46, is of a larger cross section so as to have the required thickness to properly actuate the overcenter spring 60. The spring 60 is designed so as to exert the required contact pressure and weld breaking force when its component forces are properly adjusted. It should be understood that a coil-type barrel-shaped spring overcenter connecting member (not shown) could be substituted for overcenter spring 60.

Thermal relay 10 is further provided with a thermally responsive member generally indicated at 70 which may be formed of a conventional thermostatic material such as bimetal formed of two layers, 73 and 74, having unequal coefficients of thermal expansion, with the outer layer 73 having the higher coefficient of thermal expansion. Layers 73 and 74, which are respectively, the high and low expansion layers, are respectively represented on the drawings by HES and LES. Bimetal element 70 is substantially U-shaped in elevation, as seen in FIGS. 3 and 5, and includes upper and lower portions 76 and 78. Bimetal element 70 is also substantially U-shaped, as seen in plan view in FIG. 1, and includes legs 80 and 82, as best seen in FIGS. 1 and 2. One end, 81, of leg 80 is electrically connected to and mounted on terminal 28, at the lower side thereof, as best seen in FIGS. 2 and 6. Leg 82 is electrically connected at one end 83 to and mounted on terminal 26 at the lower side thereof as by welding, as best seen in FIGS. 2 and 6. The other ends of legs 80 and 82 meet at an intermediate or bight portion 84. Bight portion 84 of thermally responsive element 70 is interconnected with contact arm 46 by rivet contact 72, as best seen in FIG. 4. Bight portion 84 is maintained in electrically insulated relation with rivet contact 72 and contact-carrying arm 46 by means of an electrically insulating bushing 86, as best seen in FIG. 4. Electrically insulating bushing 86 has a countersunk portion 87 in which contact rivet 72 is disposed and is spaced from the upper surface 88 of insulating bushing 86. Upper surface 88 of insulating bushing 86 serves as an abutment surface for a purpose to be described below.

Insulating bushing 86 is formed of an electrically insulating material such as for example, nylon or Teflon (the latter being a registered trademark to E. I. du Pont de Nemours Co. for a plastic consisting of a tetrafluoroethylene polymer). Thus, the rivet contact 72 and insulating bushing 86 serve a dual function, namely that of connecting bimetal element 70 with the contact arm 46 and completing a shunting circuit when mated with contact 32, which shunting circuit will be described in greater detail below.

Contact arm 46, which is interconnected with bight portion 84 of thermally responsive means 70, moves with bight portion 84 in response to movement of the latter at predetermined changes in temperature conditions so as to cause contact arm 48 to snap from one position of stability such as, for example, shown in FIG. 3, to an opposite position of stability, such as shown in the solid lines in FIG. 5.

Thermal relay 10 further includes adjustable calibration means generally indicated at 90 for the U-shaped thermally responsive means 70. Calibration means 90 comprises an adjusting screw in threaded engagement with an appropriate aperture provided by base 12. The upper end of adjusting screw 90 is in engagement with both legs 80 and 82 of thermally responsive means 70, as best seen in FIGS. 1, 2 and 6. The adjusting screw is formed of an electrically insulating material, and upon rotation thereof, will deform thermally responsive element 70 and vary its initial temperature set.

Base 12 is provided with a recess portion 92, as best seen in FIGS. 2 and 3, which affords a layer of air between a substantial portion of the thermally responsive element 70 and the base 12 so as to reduce heat transfer therebetween.

Base 12 further includes a transversely extending projection 94, as best seen in FIGS. 1 and 2. Projection 94 provides arc shadow which is effective to constitute a gap in and prevent the creation of a low resistance electrical current path leading from contact 34 to terminal 26 or to terminal 28. Such a low resistance electrical current path could be formed by particles of silver or other materials of the contact 69, which may be thrown off as the contacts 69 and 34 make and break quickly due to snap action. As such particles are thrown off, they will strike the upper vertical and horizontal sides of projection 94 closest to contacts 69 and 34 and will not strike the lower inside corner 95, which is remote from contacts 69 and 34 and which inside corner constitutes a gap in any low resistance path which might be created as described above.

Base member 12 further provides a longitudinally extending rib or projection 96, as best seen in FIGS. 2 and 3, which is effective to prevent short-circuiting paths between legs 80 and 82 of thermally responsive means 70 and between terminals 26 and 28 which might be created by particles of silver thrown off from contact 69 as the latter makes and breaks quickly with contact 34, as described above, or which might be created due to weld splattering during fabrication of the thermally responsive element 70, terminals 26 and 28 and switch means 40 subassembly.

In practice, thermally responsive means 70, switch means 40, terminals 26 and 28 are preassembled as a subassembly which is slidably inserted into base member 12, after terminal 30 with contact 34 thereon has been slidably inserted into slot 18 of the base member 12 and securely fastened in place by staking or other means (not shown). The longitudinally extending rib 96 additionally serves as a guide means to position the aforementioned subassembly in proper assembled relation to base 12. As best seen in FIGS. 2 and 3, when the thermally responsive element 70, switch means 40, terminals 26 and 28 subassembly is in final assembled relation within base member 12, legs 80 and 82 straddle longitudinally extending projection 96. Thereafter, a cover member 100 to be described below, is fixedly secured to base member 12.

Thermal relay 10 is further provided with a cover member 100 which includes a shoulder 102 on the interior thereof extending peripherally therearound and which is complementary to and mates with the irregular upper surfaces of base 12, as best seen in FIG. 3 to align the cover member 100 with base member 12 in proper assembled relation. Cover member 100 may be secured to base 12 in any known convenient manner, such as by bolting or gluing, etc. (not shown).

Cover member 100 has integrally formed therewith a downwardly extending projection 104, as best seen in FIG. 3. Projection 104 provides an upper limit stop for contact arm 48 in snapping from the contacts 69 and 34 closed plosition, seen in FIG. 3, to the contacts open position, as shown in solid lines in FIG. 5. By varying the length of the downward extent of projection 104, as seen in FIGS. 3 and 5, the temperature differential and reset characteristics of the device can be regulated.

Cover member 100 further includes another downwardly extending projection 106 which is adapted to be engaged by abutment surface 88 of insulating member 86 and provides an upper limit stop for upward movement of thermally responsive means 70. Projection 106, in addition to serving as an upper limit stop for movement of portion 76 of thermally responsive means 70, further ensures that contacts 69 and 34 will have sufficient contact pressure therebetween.

The thermal relay, thus far described, as illustrated in FIGS. 1–6, is especially suited for, though not limited to, use as a protective thermal type time-delay relay for fractional horsepower split-phase electric motors. In this environment, the thermal time-delay relay 10 functions as a start winding control for such motors, which are generally appliance type motors having high density start windings which generally require a device having the ability to switch currents of 20 to 30 amperes per life of 100,000 operations. The thermal time delay relay 10 is effective to de-energize the start winding within the required short period of time specified for the particular motor to prevent the start winding from being subjected to continued current for a damaging length of time or to excessively high currents. Contacts 69 and 34, and contacts 72 and 32 of thermal time delay relay 10, when the latter is employed as a protective and switching device for the start winding of a split-phase electrical motor such as described above, will constitute, respectively, a pair of normally closed start winding contacts and a pair of normally open shunt contacts. Normally open shunt contacts 72 and 32, as will be described in greater detail below, are effective to shunt out bimetal element 70 after normally closed start contacts 69 and 34 have been opened, to prevent overheating and burn out of the bimetallic thermally responsive means 70.

Referring now to the circuit diagrams of FIGS. 7 and 8, the thermal time delay relay 10 is schematically illustrated in exemplary protective circuits with a split-phase electrical motor having an auxiliary, start or phase winding 110 and a main winding 112.

Referring now specifically to FIG. 7, terminal 26 of thermal relay 10 is electrically connected to $L_2$, one side of a power source. Terminal 30 is electrically connected in series with start or phase winding 110 and terminal 28 is electrically connected in series with main winding 112. Normally closed start contacts 69 and 34 are connected in series with start winding 110 through terminal 30. Legs 80 and 82 of bimetal member 70 are connected in series with main winding 112 through terminal 28 and normally open shunt contacts 32 and 72 are connected in shunt across legs 80 and 82 and thus shunt contacts 32 and 72 are also connected in series with main winding 112 through terminal 28. As shown in FIG. 7, the bimetal element 70 carries both the start and main winding currents when start contacts 34 and 69 are closed. In this condition, both legs 80 and 82 each carry both the start and main winding current, thereby providing a uniform heating throughout the entire bimetal element, since each of legs 80 and 82 have equal electrical resistance and are carrying equal amounts of current. If there were unequal current in legs 80 and 82 and therefore unequal heating there could be differential movement of the legs due to such unequal heating which could result in an undesirable twisting movement. In this condition, the cooler leg of the bimetal would impede vertical movement of the other leg and would reduce the efficiency of the thermally responsive means. Since there is uniform heating and electrical current flow throughout the entire bimetal element, there is no localized heating or hot spots and/or stress concentration and movement of legs 80 and 82 in response to temperature change is limited substantially to a reciprocally vertical direction in concert, as viewed in FIG. 3. When start winding contacts 69 and 34 are separated, and shunting contacts 32 and 72 are open, both legs 80 and 82 of bimetal element 70 will carry only the main winding or line current.

Referring now to FIG. 8, terminal 28 is electrically connected to $L_4$, one side of a power source. Terminal 30 is connected in series with start winding 110 and terminal 26 is connected in series with main winding 112. In the circuit of FIG. 8, bimetal element 70 carries only the main winding current in each of the legs 80 and 82 irrespective of whether start contacts 34 and 69 are open or closed. Legs 80 and 82 of bimetal element 70 are connected in series with main winding 112 through terminal 26 and normally open shunt contacts 32 and 72 are electrically connected in shunt across legs 80 and 82 of bimetal element 70 and thus are also connected in series with main winding 112 through terminal 26. Normally closed contacts 34 and 69 are electrically connected in series with start winding 110 to terminal 30.

The sequence of operation of the thermal relay 10 is substantially as follows: when the circuit of FIG. 7 is energized upon starting of the motor, start winding current flows through terminal 26, bimetal legs 80 and 82, switch means 40, contact-carrying arm 48, start contacts 69 and 34 and terminal 30. Main winding current flows through terminal 26, bimetal legs 80 and 82 and terminal 28. When start contacts 69 and 34 are closed, bimetal element 70 will be heated by both the start and main winding current flowing therethrough and as the motor comes up to speed, the bimetal element 70 will move contact arm 46 downwardly therewith (as viewed in FIGS. 3 and 5 and shown in the dashed line portions in FIG. 5) in response to the heat generated by the start and main winding current passing therethrough, and cause contact arm 48 to snap from its position of stability wherein contacts 69 and 34 are closed to the opposite position of stability wherein contacts 69 and 34 are open, (as shown in the solid lines in FIG. 5) to de-energize the start winding within the required very short time. In the condition where normally closed start contacts 34 and 69 are open and normally open shunting contacts 32 and 72 are open, the main winding or line current will continue to flow through bimetal element 70. As bimetal element 70 continues to heat due to the main winding current flowing therethrough after start contacts 34 and 69 are open, it will continue to move downwardly with arm 46 and urge normally open shunt contacts 72 and 32 into engagement to shunt the main winding current out of the bimetal element 70 and route the current in a path through terminal 26, contact 32, contact 72, contact-carrying arm 46, leg 42 of switch means 40, to terminal 28, to thereby protect the bimetal element 70 from overheating and burn out due to excessively high current which might be encountered in overload or locked rotor conditions of the motor or main winding current flow for a damaging length of time. After shunt contacts 32 and 72 are closed, thereby shunting the main winding current out of the bimetal element 70, bimetal element 70 will cool, move upwardly along with arm 46 (as seen in FIG. 3) and open shunting contacts 32 and 72, and thereby cause the main winding current to again flow through the bimetal element 70 and result in further heating thereof. This further heating causes bimetal element 70 to move in a direction to again close the contacts 32 and 72 before the bimetal element 70 has cooled and moved upwardly sufficiently (as viewed in FIG. 3) to cause snap action of contact arm 48 to a start contacts closed position. This cyclic action continues as long as the motor is energized. Shunting contacts 72 and 32 in cycling between a contacts-open and closed position, while start contacts 69 and 34 are open, are effective to maintain the thermally responsive means 70 at a lower temperature which is just slightly above the reset temperature of the device, (that is that temperature at which thermally responsive means 70 would cause arm 48 to snap to a start contacts 69 and 34 closed position to re-energize the start winding). The shunt contacts 72 and 32 by co-operating with thermally responsive means 70 to maintain the latter at this lower temperature advantageously afford a quick reset of the device.

Thus it is seen from the above that the bimetal element 70 is effective to de-energize the start winding within the required very short time and is also effective to protect itself from overheating and maintain itself at a temperature just slightly above the reset temperature by cyclically causing shunting contacts 32 and 72 to shunt the main winding current out of the bimetal element 70, as described above. Once having opened the start contacts 34 and 69, bimetal element 70 will maintain the start contacts 34 and 69 in an open condition while current flows through the main winding and will hunt between a position in which both start contacts 34 and 69 and shunt contacts 32 and 72 are open and a position in which start contacts 34 and 69 are open and shunt contacts 32 and 72 are closed. The above is equally applicable to each of the circuits of FIGS. 7 and 8.

FIGS. 7 and 8 differ mainly in that in the circuit of FIG. 7 the bimetal element carries the line current e.g. both start and main winding currents when start contacts 34 and 69 are closed, whereas in the circuit of FIG. 8, the bimetal element carries only the main winding current irrespective of whether start contacts 69 and 34 are open or closed.

The bimetal thermally responsive element 70 of the relay 10, being U-shaped as best seen in FIG. 3 (as defined by portions 76 and 78) affords the advantageous result of permitting a much smaller constructed, miniaturized switch and yet provides substantially greater thermal activity and thermal force per unit change in temperature, than that which could be obtained with a bimetal element in a straight cantilever or strip form in the same size miniaturized switch. A cantilever bimetal strip providing the same thermal activity and thermal force as that of U-shaped bimetal thermally responsive element 70 would require a switch structure of a size substantially greater than that required for the U-shaped bimetal element 70. Another advantage of the U-shaped bimetal element 70 over a cantilever strip bimetal element of the same length is that the former provides the same electrical resistance as the latter but can be employed in a much smaller miniaturized switch construction. The switching element 40, because of its U-shape, and particularly because of the arrangement of the contact arms 46 and 48, also permits miniaturization of the switch and is more sensitive and responsive to movement of bimetal element 70 and requires little or minimum thermal force of movement by the bimetal element to cause contact arm 46 to move and to snap the contact-carrying arm from a contacts-closed to a contacts-open position, or vice versa, or to open and close shunting contacts 32 and 72.

The thermal relay 10 may also be calibrated by varying the overcenter spring 60 component of force which is attempting to distort the thermostatic element 70 from a preset neutral position. The reset of the thermal relay 10 can be calibrated by adjusting the contact gap between the start contacts 69 and 34 which may be effected by varying the extent of projection 104. By proper calibration of thermostatic element 70 or by constructing it of material of a high electrical resistance, the operating temperature of the thermal relay can be elevated to a point where the operating characteristics thereof will not be substantially affected by small changes in ambient temperature conditions.

Thermal relay 10 can also be constructed so as to provide a quick reset of the start contacts by calibrating the bimetal element or constructing it of a high electrical resistance material for high operating temperature so that the bimetal element will cool quickly.

Thermal time delay relay 10 can be employed in a plurality of circuit arrangements such as, for example, the two exemplary circuits shown in FIGS. 7 and 8 wherein the bimetal element 70 is connected either on the line side or main winding side (i.e. terminals 28 and 26 can be selectively connected to the line or main winding side).

Thermal relay 10 is versatile and is applicable to protect and switch the start or phase winding of motors which have a high start to main winding current ratio and also motors which have a relatively low start to main winding current ratio. Where the thermal relay is employed with a motor which has a high start to main winding current ratio and it is desired to have a quick break of start contacts or a short operating time, terminal 26 can be connected to line so that bimetal thermally responsive element 70 will carry both start and main winding current when the start contacts 34 and 69 are closed. Consequently, from the above it is seen that the thermal relay 10 can be employed so as to provide varying operating times on the same motor by varying the type of circuit employed.

Thermal relay 10 is also adapted to be provided with a back contact arrangement on the start contact switching arm 48 so as to be operative to close a third circuit when start contacts 69 and 34 are opened. This arrangement is particularly useful for example, in electric home appliances such as electrical laundry driers where it is desired not to energize a heater circuit until after the high current operating, start windings are de-energized so as to avoid overloading the power supply. In this arrangement, switching arm 48 would have a contact (not shown) carried by and electrically connected to the upper surface thereof opposite contact 69 and cover 100 would be appropriately provided with a contact-carrying terminal (not shown).

From the above, it is clear that thermal time delay relay 10 provides a miniaturized, reliable, simply constructed, low-cost device, with a minimum number of parts, which is reliable in operation and wherein the bimetal element serves the dual function of effecting de-energization of the start winding and self-protecting from overheating by the main winding current passing therethrough and maintaining its temperature just slightly above the reset temperature by shunting itself out as described above. Thermal relay 10, because of its snap-acting character, provides an increased start contact life over that which would be available with a creep-acting type device.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A switching device comprising a base; said normally closed contact and said normally open contact being mounted on the base; a pair of normally closed contacts; a pair of normally open contacts; a creep-acting thermally responsive electrically conductive member mounted on the base and; a contact-carrying member mounted on the base having first and second portions, said first portion mounting one of said normally closed contacts for movement away from the other of said normally closed contacts in response to movement of said thermally responsive member in one direction upon the latter being heated to a first predetermined amount by the flow of current therethrough, said second contact-carrying member portion also mounting one of said normally open contacts for movement into engagement with the other of said normally open contacts in response to further movement of said thermally responsive member in said one direction upon the latter being heated to another predetermined amount by the current flow therethrough to shunt out said thermally responsive member upon mutual engagement of said normally open contacts, one of said first and second portions of said contact-carrying member being engaged by said thermally responsive member for movement therewith; means electrically insulating and interconnecting one of said first and second portions of said contact-carrying member to said thermally responsive member and over center spring means interconnecting said first and second said contact-carrying member portions for snap movement of one of said first and second portions relative to the other in response to first predetermined movement of the thermally responsive member and for creep-movement of one of said first and second contact-carrying portions relative to the other in response to second predetermined movement of said thermally responsive member.

2. The device as recited in claim 1 and wherein said electrically insulating means mount said movable contact of said pair of normally open contacts in electrically insulated relation to said thermally responsive member and in electrically conducting relation to said contact-carrying member.

3. The device as recited in claim 1 and wherein said over center spring means co-operates with said thermally responsive member and said contact-carrying member to maintain the latter in a first position wherein said normally closed contacts are closed and said normally open contacts are open and to snap said contact-carrying member in response to movement of said thermally responsive member in said one direction to a second position wherein said normally closed contacts are open.

4. The device as set forth in claim 1 and wherein said thermally responsive member comprises a U-shaped bimetal element having a portion of one of the legs thereof adjacent and engageable with a portion of one surface of said contact-carrying member for movement of the latter in response to movement of the former.

5. The device as set forth in claim 4 and including adjustable calibrating means for said bimetal element, said last-named means being operable for adjustment exteriorly of said device.

6. A control device for an electric motor having a main and a phase winding, comprising a base; three electrical terminals mounted on the base; a pair of normally closed electrical contacts and a pair of normally open electrical contacts, one of said normally closed contacts being mounted on and electrically connected to a first one of said terminals; an electrically conductive switch member having first and second portions, said first portion carrying the other of said normally closed contacts for movement into and out of engagement with said one of said normally closed contacts, a portion of said switch member spaced from the other of said normally closed contacts being electrically connected to a second one of said terminals, one of said normally open electrical contacts being mounted on and electrically connected to the third one of said terminals, the other of said normally open contacts being carried by said second portion of said switch member for movement into and out of engagement with said one of said normally open contacts; an electrically conducting creep-type thermally responsive member having spaced portions respectively electrically connected to and mounted on said second and third terminals, said thermally responsive member being mounted for movement upon being heated to a predetermined amount by the current flow therethrough, said second portion of said switch member being connected in electrically insulated relation with said thermally responsive member for movement therewith in each of two opposite directions in response to movement of said thermally responsive member, and over center spring means interconnecting said first and second portions of said switch member for effecting snap movement of said first switch member portion relative to said second switch member portion to cause snap opening of said normally closed contacts in response to movement of said thermally responsive member upon the latter being heated to one predetermined amount by the current flow therethrough, and to thereafter, cause said second switch member portion to move relative to said first switch member portion by creep-action to close said normally open contacts and thereby shunt out the thermally responsive member in response to movement thereof upon the latter being heated to another amount by the current flow therethrough.

7. The control as set forth in claim 6 and including adjustable calibrating means for said thermally responsive element; said last-named means being engageable with said thermally responsive element and operable for adjustment exteriorly of said device.

8. The device as set forth in claim 6 and wherein said thermally responsive member comprises a U-shaped bimetal element having a portion of one of the legs thereof connected to and movable with a portion of said switch member for movement of the latter in response to movement of the former and means electrically insulating said last-named portions.

9. The device as set forth in claim 6 and wherein said electrically conductive switch member comprises a U-shaped element with a portion of one of the legs thereof electrically connected to said second terminal and the other leg thereof mounting said other of said normally open contacts and biasing said last-named contact to a contacts-open position, said other of said legs of said U-shaped element being connected with said thermally responsive member to close said normally open contacts when the latter is heated to said another predetermined amount.

10. The thermal relay as set forth in claim 6 and electrically insulating means connecting said thermally responsive means to said switch member for movement of the latter in response to movement of the former, said electrically insulating means mounting said movable contact of said pair of normally open contacts in electrically insulated relation to said thermally responsive member and in electrically conducting relation to said switch member.

11. An electrical switch comprising a base; three electrical terminals mounted on the base; a pair normally closed electrical contacts and a pair of normally open electrical contacts, one of said normally closed contacts being mounted on and electrically connected to a first one of said terminals; an electrically conducting thermally responsive member; an electrically conductive switch member including a pair of contact-carrying arms movable relative to each other; snap-acting means interconnecting said arms providing for snap movement of one of said arms; the other of said normally closed contacts being mounted on and electrically connected to said one of said arms for snap movement into and out of engagement with said one of said normally closed contacts in response to movement of said thermally responsive member; said electrically conductive switch member having one portion thereof mounted on and electrically connected to a second one of said terminals, one of said normally open electrical contacts being mounted on and electrically connected to the third one of said terminals, the other of said normally open contacts being electrically connected to and carried by the other of said contact-carrying arms for creep movement into and out of engagement with said one of said normally open contacts, said electrically conducting thermally responsive member having spaced portions adjacent one end thereof respectively electrically connected to and mounted on said second and third terminals, said thermally responsive member having a free end connected in electrically insulated relation with said other of said contact-carrying arms for moving said one arm to effect snap movement thereof to open said normally closed contacts in response to movement of said thermally responsive member when the latter is heated to a first amount and for moving said other arm, after said normally closed contacts are opened, to close said normally open contacts and thereby shunt out said thermally responsive member in response to movement thereof when the latter is heated to a second amount which is greater than said first amount.

References Cited by the Examiner

UNITED STATES PATENTS

| | | | |
|---|---|---|---|
| 1,755,564 | 4/30 | Shoenberg | 200—115 |
| 2,117,123 | 5/38 | Werner | 317—40 |
| 2,280,960 | 4/42 | Lee | 200—113 |
| 2,284,383 | 5/42 | Elmer | 200—113 |
| 2,367,985 | 1/45 | Weeks | 317—40 |
| 2,381,557 | 8/45 | Ray | 200—138 |
| 2,417,912 | 3/47 | Clark | 317—13 |
| 2,475,038 | 7/49 | Lucas | 317—13 |
| 2,496,135 | 1/50 | Sedwitz | 200—138 |
| 2,805,302 | 9/57 | Reis | 200—138 |
| 2,820,870 | 1/58 | Moksu | 200—138 |

FOREIGN PATENTS 1,063,252  4/54  France.

BERNARD A. GILHEANY, *Primary Examiner.*

SAMUEL BERNSTEIN, *Examiner.*